United States Patent
Kuriyama et al.

[11] Patent Number: 5,933,341
[45] Date of Patent: Aug. 3, 1999

[54] POWER CONVERTING APPARATUS

[75] Inventors: Shigemi Kuriyama; Taro Ando; Katsushi Ikeda; Yohichi Goto; Masakatu Daijyo; Akinori Nishihiro, all of Tokyo, Japan

[73] Assignee: Mitsubishi Denki Kabushiki Kaisha, Tokyo, Japan

[21] Appl. No.: 08/987,710

[22] Filed: Dec. 9, 1997

[30] Foreign Application Priority Data

Mar. 11, 1997 [JP] Japan ................................. 9-056133

[51] Int. Cl.$^6$ .......................... H02M 3/24; H02H 7/122; H02H 7/00
[52] U.S. Cl. .................................. 363/98; 363/56; 361/18
[58] Field of Search ................................. 363/55, 56, 58, 363/98; 361/18, 93

[56] References Cited

U.S. PATENT DOCUMENTS

| | | | |
|---|---|---|---|
| 4,189,764 | 2/1980 | Snyder | 363/97 |
| 4,363,068 | 12/1982 | Burns | 361/91 |
| 4,626,952 | 12/1986 | Morikawa | 363/56 |
| 5,687,049 | 11/1997 | Mangtani | 363/18 |
| 5,719,519 | 2/1998 | Berringer | 361/93 |
| 5,719,754 | 2/1998 | Fraidlin et al. | 363/98 |
| 5,719,759 | 2/1998 | Wagner et al. | 363/98 |

FOREIGN PATENT DOCUMENTS

| | | | |
|---|---|---|---|
| 5-219752 | 8/1993 | Japan | H02M 7/48 |
| 1 299 266 | 12/1972 | United Kingdom | H02M 1/18 |
| 2 113 487 | 8/1983 | United Kingdom | H02M 1/18 |

*Primary Examiner*—Peter S. Wong
*Assistant Examiner*—Bao Q. Vu
*Attorney, Agent, or Firm*—Sughrue, Mion, Zinn, Macpeak & Seas, PLLC

[57] ABSTRACT

A power converting apparatus is comprised of an inverter unit arranged by a switching semiconductor element 51a for an upper arm and another switching semiconductor element 51d for a lower arm, and for turning ON/OFF the switching semiconductor elements to thereby convert DC power inputted from a DC power supply into AC power; and control means 10a for judging as to whether or not an abnormal operation is present based upon an output of a comparator 11a for judging as to whether or not a detection voltage detected by a voltage detecting circuit 61 is substantially equal to a voltage of the positive polarity; an output of a comparator 11b for judging as to whether or not a detection voltage detected by the voltage detecting circuit 61 is substantially equal to a voltage of the negative polarity; and an output signal of an igniting signal for ON/OFF-controlling the switching semiconductor elements, this voltage detecting circuit 61 detecting an output voltage of the inverter unit via a voltage dividing resistor, while using as a reference a potential at the positive polarity of the DC power supply, or a potential at the negative polarity thereof.

7 Claims, 5 Drawing Sheets

| GATE SIGNAL | | COMPARATOR OUTPUT | | JUDGMENT RESULT |
|---|---|---|---|---|
| G_P | G_N | V_PC | V_NC | |
| ON | OFF | H | H | NORMAL |
| ON | OFF | L | - | ABNORMAL |
| OFF | ON | L | L | NORMAL |
| OFF | ON | - | H | ABNORMAL |

FIG. 8 PRIOR ART
| GATE SIGNAL | | SEMICONDUCTOR CONDITION | OUTPUT VOLTAGE Vo |
|---|---|---|---|
| $G_P$ | $G_N$ | | |
| ON | OFF | POSITIVE SEMICONDUCTOR ON | POSITIVE VOLTAGE |
| OFF | ON | NEGATIVE SEMICONDUCTOR ON | NEGATIVE VOLTAGE |
| OFF | OFF | BOTH POSITIVE AND NEGATIVE SEMICONDUCTORS ARE TURNED OFF | WHEN $I_o > 0$, NEGATIVE VOLTAGE |
| | | | WHEN $I_o < 0$, POSITIVE VOLTAGE |
| | | | WHEN $I_o = 0$, NO DEFINITION |
NOTE: $I_o$: OUTPUT CURRENT
FIG. 9A PRIOR ART
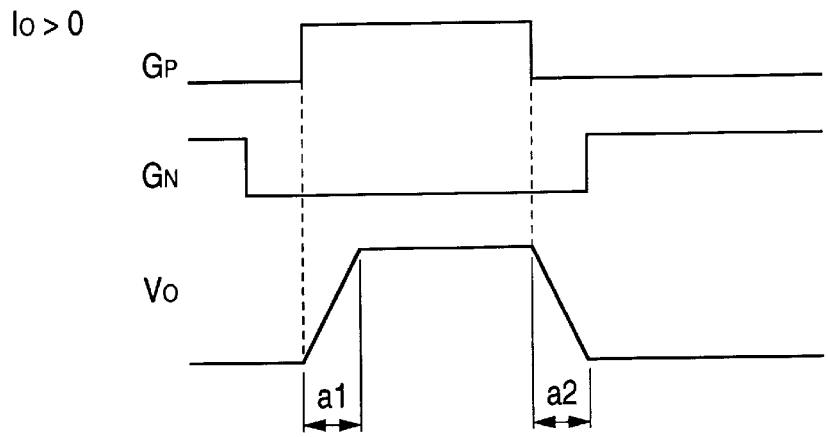
FIG. 9B PRIOR ART
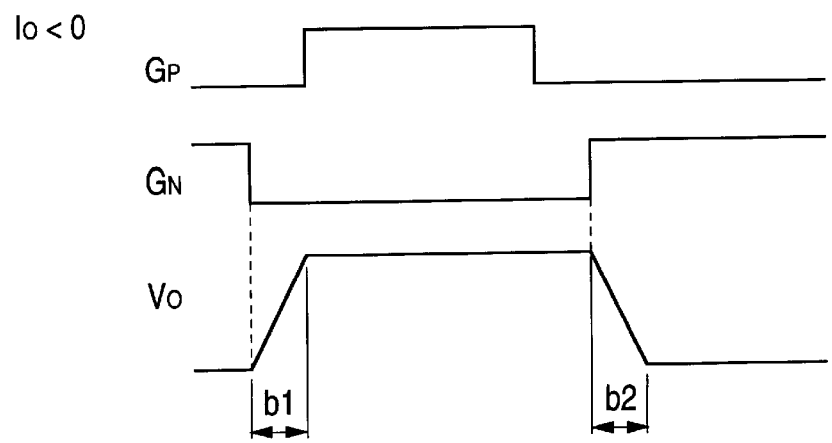

POWER CONVERTING APPARATUS

BACKGROUND OF THE INVENTION

1. Field of the Invention

The present invention is related to a power converting apparatus such as a voltage type inverter for driving an AC motor. More specifically, the present invention is directed to a power converting apparatus having a shortcircuit protection apparatus for protecting a shortcircuit of a self dis-igniting element (for instance, a bipolar transistor, and IGBT) functioning as a switching semiconductor element thereof.

2. Description of the Related Art

FIG. 6 is a diagram for showing the power converting apparatus including the conventional shortcircuit protection apparatus, which is described in Japanese Laid-open (KOKAI DISCLOSURE) Patent Application No. 5-219752. In this drawing, reference numeral 50 indicates a three-phase inverter circuit functioning as an inverter, reference numeral 52 (52a to 52f) shows a drive circuit for driving each of self dis-igniting elements 51a to 51f, a symbol "CT (CT1, CT2)" denotes a current detector. Also, reference numeral 55 indicates a control apparatus, reference numeral 56 shows an induction motor, symbol "Ed" indicates a DC power supply, reference number 60 shows a shortcircuit sensing circuit, reference numeral 61 denotes a voltage detecting circuit, reference numeral 62 represents a failure (malfunction) judging circuit, and reference numeral 63 indicates a failure signal.

In general, as the control system of the 3-phase inverter circuit 50, the PWM control is used by which the igniting signals (gate signals) are supplied to the self dis-igniting elements 51a to 51f for constituting the inverter so as to turn ON/OFF the self dis-igniting elements 51a to 51f, so that the magnitude of the output voltage of the inverter and the frequency are controlled.

FIGS. 7A to 7C are diagrams for explaining the arrangement of the shortcircuit sensing circuit 60 and the operations thereof as the shortcircuit protection apparatus of the conventional power converting apparatus. In this drawing, FIG. 7A shows an arrangement for 1 phase, namely a U phase of 3 phases. Since other V phase and W phase are similar to this U phase, drawings and explanations thereof are omitted. FIG. 7B is a time chart for representing operations of the shortcircuit sensing circuit 60 during the normal operation. FIG. 7C is a time chart for indicating operations of the shortcircuit sensing circuit 60 during the abnormal operation.

In FIG. 7A, in the voltage detecting circuit 61, the output voltage of the inverter is detected via the voltage dividing resistors R1 and R2, while using the potential at the negative polarity N of the DC power supply Ed. The detection voltage Vo is inputted into the failure judging circuit 62. In the failure judging circuit 62, this detection voltage Vo is compared by the two comparators CP1 and CP2, and the failure is judged by the failure judging device 64 in response to the outputs from the comparators CP1 and CP2.

In this case, the reference value "a" of the comparator CP1 is set to such a value higher than, equal to ½ of the DC power supply voltage "Ed", and also lower than this DC power supply voltage "Ed". Then, this reference value "a" is compared with the detection voltage Vo by the comparator CP1. When the detection voltage Vo is higher than the reference value "a", it is judged that the self dis-igniting element on the positive polarity side (in this case, element 51a) is turned ON.

Also, the reference value "b" of the comparator CP2 is set to such a value higher than, or equal to 0V, and also lower than, or equal to ½ of the DC power supply voltage Ed. Then, this reference value "b" is compared with the detection voltage Vo by the comparator CP2. When the detection voltage Vo is lower than the reference value "b", it is judged that the self dis-igniting element on the negative polarity side (in this case, element 51b) is turned ON.

Next, operations of the failure detector 64 will now be explained with reference to a time chart shown in FIGS. 7B and 7C. In this case, the outputs of the comparators CP1 and CP2 are expressed by the following logic levels (H, L):

detection value Vo>reference value "a", or reference value "b"=L;

detection value Vo<reference value "a", or reference value "b"=H.

During the normal operation of FIG. 7B, when the positive-polarity-sided switching element 51a is turned ON, the detection voltage Vo becomes higher than, or equal to the reference value "a" of the comparator CP1, and thus both the outputs from the comparators CP1 and CP2 become "L", namely are made coincident with each other. Similarly, in such a case that the negative-polarity-sided switching element 51d is turned ON during this normal operation, the detection value Vo is lower than, or equal to the reference value "b" of the comparator CP2, so that both the outputs from the comparators CP1 and CP2 become "H", namely are made coincident with each other.

However, as indicated in FIG. 7C, when a shortcircuit failure happens to occur at a time instant "t1", since the detection value Vo becomes lower than the reference value "a" of the comparator CP1 and higher than the reference value "b" of the comparator CP2, the output of the comparator CP1 becomes "H" and the output of the comparator CP2 becomes "L", so that the output of the comparator CP1 is not made coincident with the output of the comparator CP2. As explained above, since the output of the comparator CP1 is not made coincident with the output of the comparator CP2, it may be recognized that the inverter is brought into the shortcircuit condition.

Thus, the failure judging device 64 judges an occurrence of a failure based upon such a fact as to whether the outputs of the comparators CP1 and CP2 are made coincident, or incoincident with each other. When these outputs of the comparators CP1 and CP2 are not made coincident with each other, the failure judging device 64 transfers the failure signal 63 to the control apparatus 55.

Then, the control apparatus 55 performs the overcurrent protection operation, namely interrupts the gating operation of the self dis-igniting element 51.

FIG. 8 is a table for representing a relationship between gate signals of the conventional power converting apparatus and the switching operations of the switching semiconductor elements. In this table, symbol "GP" indicates a gate signal (positive polarity side), symbol "GN" denotes a gate signal (negative polarity side), symbol "Vo" represents an output voltage divided by the voltage dividing resistors R1, R2, and symbol "Io" shows an output current.

(1) In the case that the positive-polarity-sided gate signal GP is "ON" and the negative-polarity-sided gate signal GN is "OFF", the positive-polarity-sided switching element is turned ON and also the output voltage Vo becomes the positive polarity voltage.

(2) In the case that the positive-polarity-sided gate signal GP is "OFF" and the negative-polarity-sided gate signal GN is "ON", the negative-polarity-sided switching element is turned ON and also the output voltage Vo becomes the negative polarity voltage.

(3) In the case that the positive-polarity-sided gate signal GP and the negative-polarity-sided gate signal GN are "OFF", the output voltages Vo are different from each other, depending upon the output current Io:

(a) When the output current Io>0, the output voltage Vo becomes the negative polarity voltage.

(b) When the output current Io<0, the output voltage Vo becomes the positive polarity voltage.

(c) When the output current Io=0, the output voltage Vo becomes unstable.

FIGS. 9A and 9B are diagrams for indicating a relationship between the gate signals of the conventional power converting apparatus and the output voltage. FIG. 9A represents a relationship between the gate signal and the output voltage in the case of the output current Io>0. FIG. 9B indicates a relationship between the gate signal and the output voltage in the case of the output current Io<0. In FIGS. 9A and 9B, symbols "a1", "a2", "b1", and "b2" indicate time periods during which intermediate voltages between the positive polarity voltage and the negative polarity voltage, are produced as the output voltages when the gate signals are varied.

As represented in FIGS. 8 and 9A, 9B, in the above-described conventional power converting apparatus, when the upper arm of the 3-phase inverter circuit and the lower arm thereof are switched, there are certain possibilities that the potential could not be stable, depending upon the current flowing directions. The upper arms of the 3-phase inverter circuit corresponds to the self dis-igniting elements 51*a*, 51*b*, 51*c*, whereas the lower arm thereof corresponds to the self dis-igniting elements 51*d*, 51*e*, 51*f*. There is a problem such that the above possibilities may be detected as the failure, or the abnormal operation.

Also, in the case that the upper/lower shortcircuit happens to occur due to the failures of the self dis-igniting elements constituting the upper/lower arms, there is another problem in that no clear definition could be made of the damaged arm.

SUMMARY OF THE INVENTION

The present invention has been made to solve the above-described problems, and therefore, has a primary object to provide a power converting apparatus capable of realizing upper/lower shortcircuit detections by an inverter circuit by employing a simple circuit arrangement without using a current detector.

Also, a secondary object of the present invention is to provide a power converting apparatus capable of specifying a damaged arm when an upper/lower shortcircuit happens to occur.

To achieve the above objects, a power converting apparatus, according to one aspect of the present invention, is featured by comprising: an inverter unit arranged by a switching semiconductor element for an upper arm and another switching semiconductor element for a lower arm, and for turning ON/OFF the switching semiconductor elements to thereby convert DC power inputted from a DC power supply into AC power; a voltage detecting circuit for detecting an output voltage of the inverter unit via a voltage dividing resistor, while using as a reference a potential at a positive polarity of the DC power supply, or a potential at a negative polarity thereof; a first comparator for judging as to whether or not the detection voltage detected by the voltage detecting circuit is substantially equal to a voltage of the positive polarity; a second comparator for judging as to whether or not the detection voltage detected by the voltage detecting circuit is substantially equal to a voltage of the negative polarity; and control means for judging as to whether or not an abnormal operation is present based upon outputs derived from the first comparator and the second comparator, and an output of an igniting signal for ON/OFF-controlling the switching semiconductor elements.

Also, the above-described control means judges as to whether or not the abnormal operation is present based on the output derived from the first comparator and the second comparator, and the outputs of the igniting signals of the switching semiconductor elements for the upper arm and the lower arm, taking account of switching delays when the igniting signals of the switching semiconductor elements for the upper arm and also for the lower arm are switched.

Furthermore, a power converting apparatus, according to another aspect of the present invention, is featured by comprising: an inverter unit arranged by a switching semiconductor element for an upper arm and another switching semiconductor element for a lower arm, and for turning ON/OFF the switching semiconductor elements to thereby convert DC power inputted from a DC power supply into AC power; a voltage detecting circuit for detecting an output voltage of the inverter unit via a first voltage dividing resistor, while using as a reference a potential at a positive polarity of the DC power supply, or a potential at a negative polarity thereof; a first comparator for judging as to whether or not the detection voltage detected by the voltage detecting circuit is substantially equal to a voltage of the positive polarity; a second comparator for judging as to whether or not the detection voltage detected by the voltage detecting circuit is substantially equal to a voltage of the negative polarity; and control means for judging as to whether or not an abnormal operation is present based upon outputs derived from the first comparator and the second comparator, and an output of an igniting signal for ON/OFF-controlling the switching semiconductor elements, whereby: a voltage for constituting judgment references of the first comparator and the second comparator is produced by dividing the power supply potential by a second voltage dividing resistor.

Furthermore, a power converting apparatus, according to another aspect of the present invention, is featured by comprising: an inverter unit arranged by a switching semiconductor element for an upper arm and another switching semiconductor element for a lower arm, and for turning ON/OFF the switching semiconductor elements to thereby convert DC power inputted from a DC power supply into AC power; a voltage detecting circuit for detecting an output voltage of the inverter unit via a voltage dividing resistor, while using as a reference a potential at a positive polarity of the DC power supply, or a potential at a negative polarity thereof; a comparator for judging as to whether or not the detection voltage detected by the voltage detecting circuit is substantially equal to a voltage of the positive polarity, or a voltage of the negative polarity; and control means for switching a comparator signal used to detect the voltage nearly equal to the positive electrode and a comparator signal used to detect the voltage nearly equal to the negative electrode as a reference value judged by this comparator in response to igniting conditions of the switching semiconductor elements for the upper arm and the lower arm for constituting the inverter unit, and for judging as to whether or not the abnormal operation is present based upon the output derived from the comparator and also outputs of igniting signals of the upper arm and also of the lower arm.

Also, a power converting apparatus, according to another aspect of the present invention, is featured by further comprising: an interrupting circuit for interrupting the switching operation of the switching semiconductor element positioned opposite to such a switching semiconductor element that an abnormal operation happens to occur when a judgment made that the abnormal operation is judged.

BRIEF DESCRIPTION OF THE DRAWINGS

FIG. 8 is a table for representing a relationship between the gate signals and the switching operations of the semiconductor elements employed in the conventional power converting apparatus; and FIGS. 9A and 9B are diagrams for indicating a relationship between the gate signals and the output voltage appearing in the conventional power converting apparatus.

DETAILED DESCRIPTION OF THE PREFERRED EMBODIMENTS

Now, a description will be given in more detail of preferred embodiments of the present invention with reference to the accompanying drawings.
(Embodiment 1)

Figure 1:
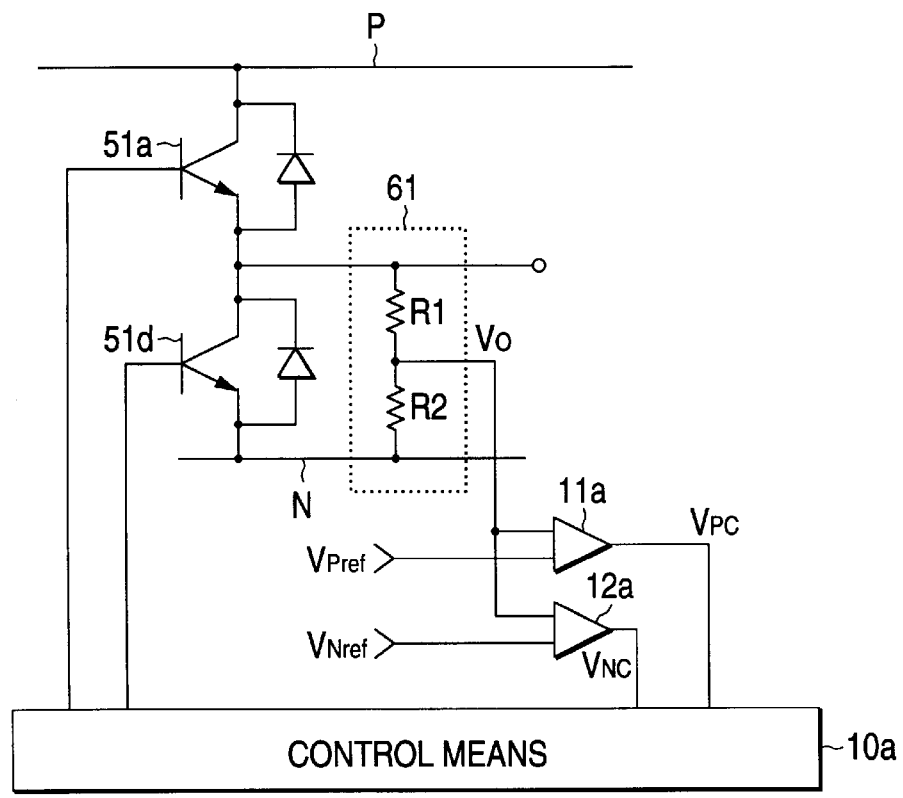
FIG. 1 is a diagram for indicating an arrangement of a power converting apparatus according to one embodiment mode of the present invention.
Figure 6:
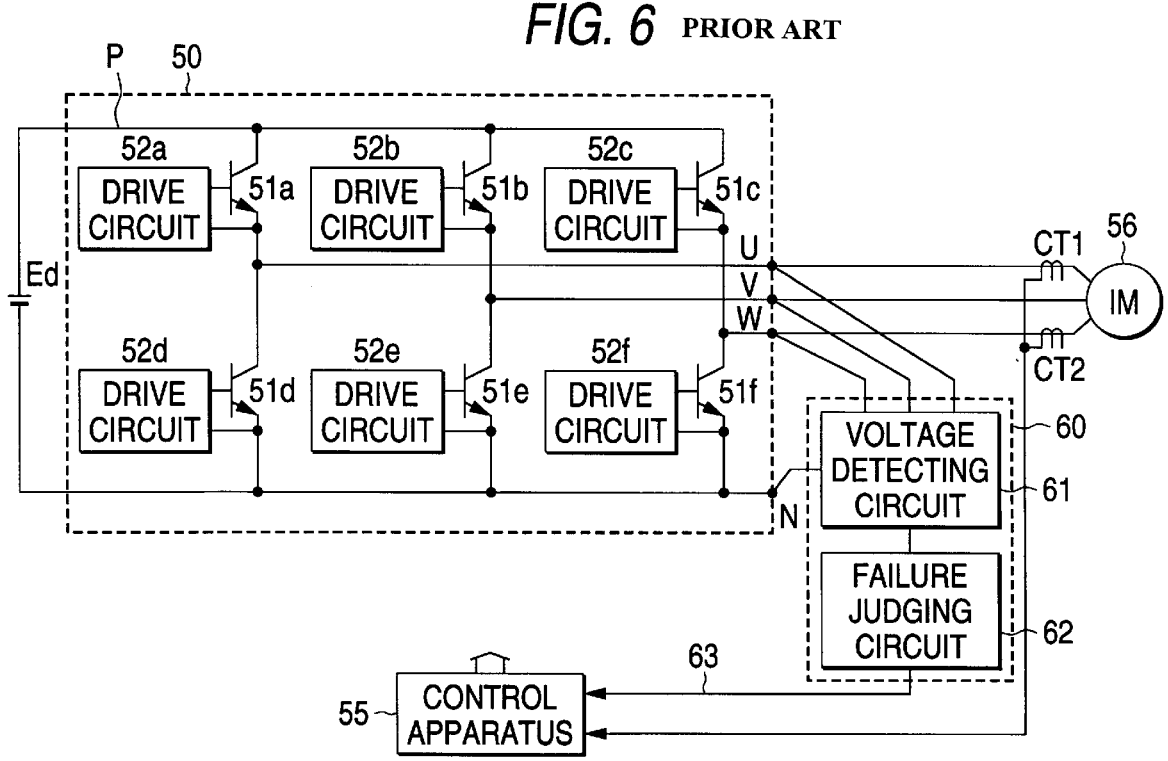
FIG. 6 is a diagram for indicating the conventional power converting apparatus and the shortcircuit protection apparatus thereof.
Figure 7A:
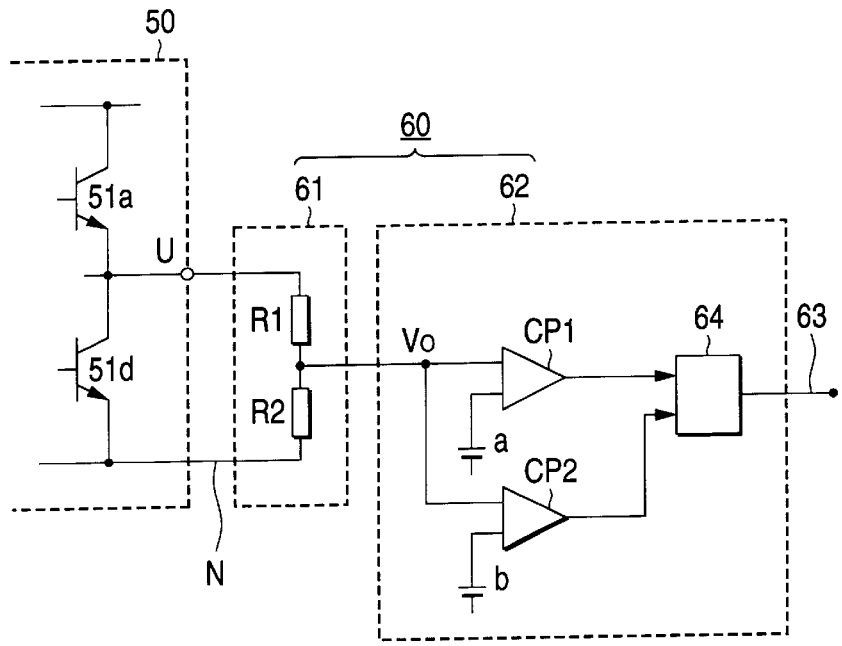
FIGS. 7A to 7C are diagrams for explaining the arrangement of the shortcircuit sensing circuit 60 and the operation thereof, which function as the shortcircuit protection apparatus of the conventional power converting apparatus.
Figure 7B:
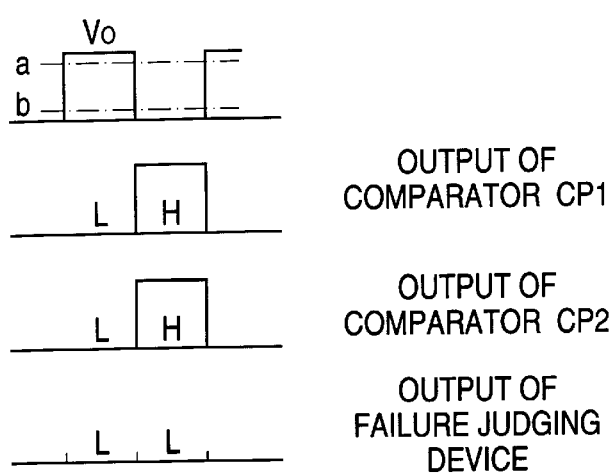
Figure 7C:
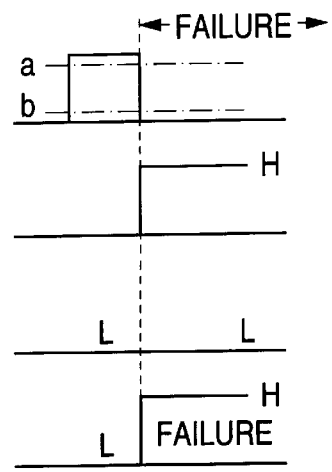

FIG. 1 is a diagram for indicating an arrangement of a power converting apparatus according to an embodiment mode of the present invention, and represents an arrangement of 1 phase, namely the U phase among 3 (three) phases. Since arrangements of other phases, i.e., the V phase and the W phase are similar to this U phase, drawings and explanations thereof are omitted. Also, since a 3-phase inverter circuit of the power converting apparatus is similar to the 3-phase inverter circuit 50 shown in FIG. 6 of the above-explained prior art, a drawing and an explanation thereof are omitted.

In FIG. 1, reference numeral 10a indicates control means; symbol "Vo" denotes an output voltage; symbol "VPref" shows a positive-polarity-voltage approximate value; symbol "VNref" indicates a negative-polarity-voltage approximate value; and reference numeral 11a represents a comparator for VP functioning as a first comparator for judging as to whether or not the output potential Vo approximates to the positive polarity voltage. Also, reference numeral 12a indicates a comparator for VN functioning as a second comparator for judging as to whether or not the output potential Vo approximates to the negative polarity voltage; symbol "VPc" indicates an output of the VP comparator 11a; symbol "VNc" denotes an output of the VN comparator 12a; reference numeral 51a shows a self dis-igniting element functioning as a switching semiconductor element for an upper arm; reference numeral 51b indicates a self dis-igniting element functioning as a switching semiconductor element for a lower arm; and reference numeral 61 represents a voltage detecting circuit for detecting the output voltage of the inverter via a voltage dividing resistor, while setting either a potential at a positive polarity of a DC power supply or a potential at a negative polarity of this DC power supply.

The control means 10a judges as to whether or not a failure happens to occur in the self dis-igniting element and also in a circuit (not shown) for outputting an igniting signal to this self dis-igniting element based upon the outputs derived from the VP comparator 11a and the VN comparator 12a, and further outputs of igniting signals used to control turning ON/OFF of the self dis-igniting elements (51a, 51d) functioning as the switching semiconductor elements for constituting the inverter unit.

In such a case that the control means 10a judges that the abnormal operation is present, switching operation of a switching semiconductor element provided opposite to such a switching semiconductor element that the failure happens to occur is interrupted by an interruption circuit (not shown).

Figure 2:
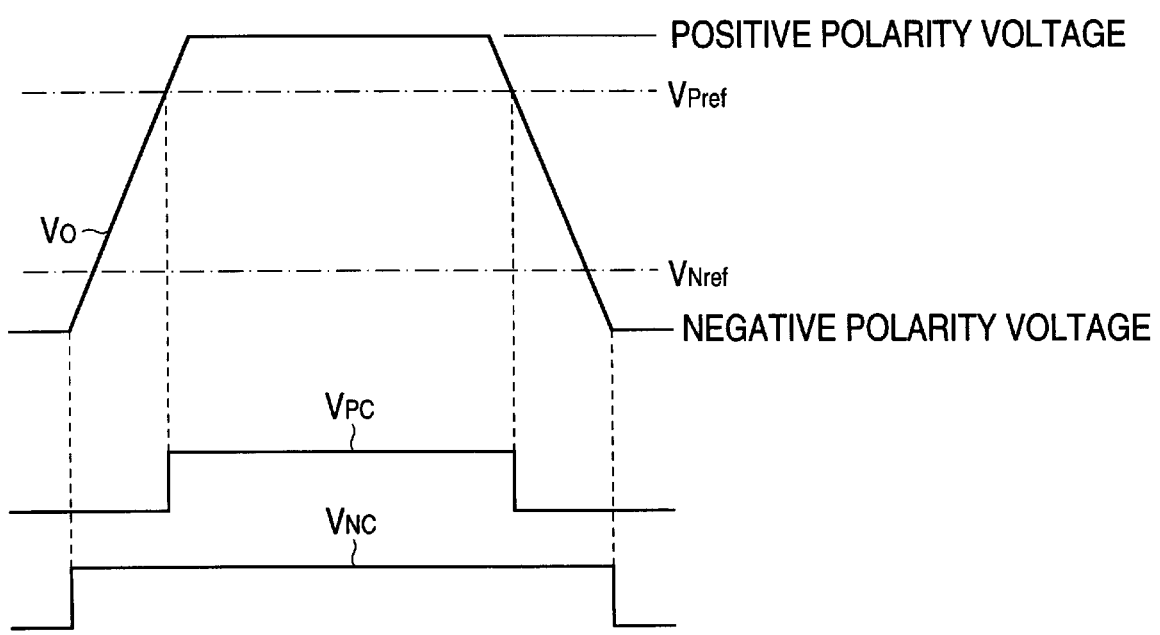
FIG. 2 is a diagram for representing operations of comparators employed in the power converting apparatus according to the embodiment mode of the present invention.

FIG. 2 is a diagram for indicating operations of the comparators employed in the power converting apparatus according to the embodiment mode 1 of the present invention. In the case that the output voltage Vo is higher than, or equal to the negative polarity voltage, the output "VNc" of the VN comparator 12a becomes "H". In the case that the output voltage Vo is higher than, or equal to VPref, the output VPc of the VP comparator 11a becomes "H".

Figures 3, 4:
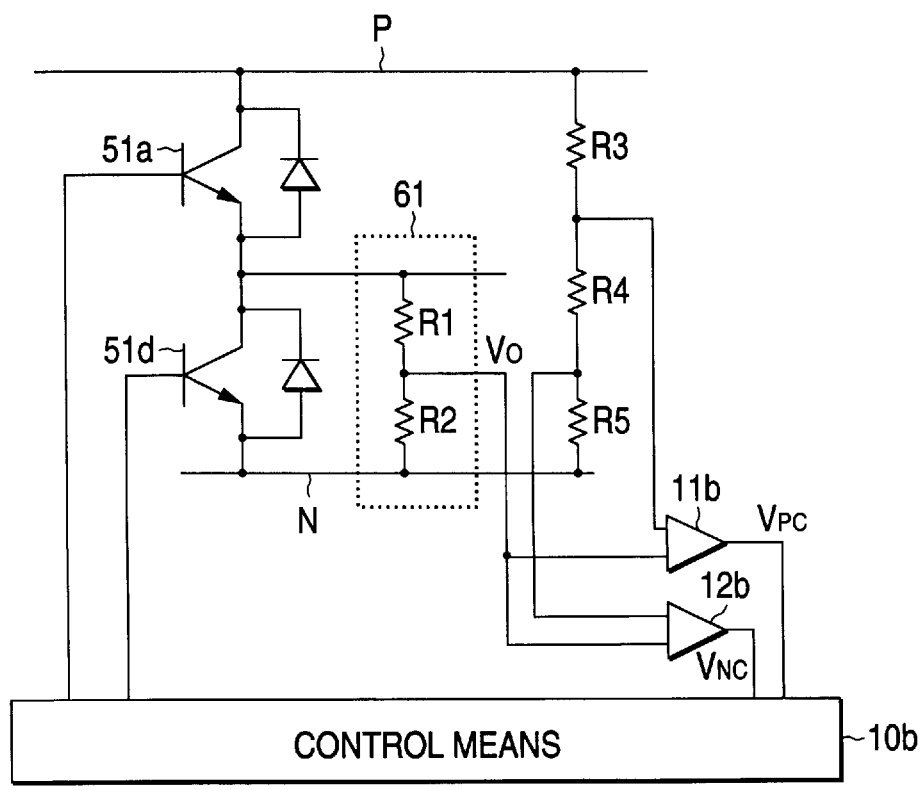
FIG. 3 is a table used to judge abnormal operations of the comparators employed in the power converting apparatus according to the embodiment mode of the present invention.
FIG. 4 is a diagram for showing an arrangement of a power converting apparatus according to another embodiment mode of the present invention.

FIG. 3 is a table for judging abnormal operations of the comparators employed in the power converting apparatus according to this embodiment mode of the present invention. In this table, symbol "GP" indicates a gate signal (positive polarity side), and symbol "GN" shows a gate signal (negative polarity side). The control means 10a may make the below-mentioned judgments based on this table.

In such a case that while the igniting signal of the upper arm is outputted (gate signal GP is under ON state, and gate signal GN is under OFF state), the output VPc of the comparator is "H" and the output VNc of the comparator is "H", the control means judges that the normal operation is present, whereas when the output VPc of the comparator is "L" (namely, output potential is not equal to positive-polarity-voltage approximate value), the control means judges that the abnormal operation is present.

In such a case that while the igniting signal of the lower arm is outputted (gate signal GP is under OFF state, and gate signal GN is under ON state), the output VPc of the comparator is "L" and the output VNc of the comparator is "L", the control means judges that the normal operation is present, whereas when the output VNc of the comparator is "H" (namely, output potential is not equal to negative-polarity-voltage approximate value), the control means judges that the abnormal operation is present.

When the control means 10a judges as to whether or not the abnormal operation is present, as explained above, the control means 10a can make more correct judgments, by taking account of the switching delays occurred when the igniting signal of the self dis-igniting element 51a functioning as the switching semiconductor element for the upper arm, and the igniting signal of the self dis-igniting element 51d functioning as the switching semiconductor element for the lower arm are switched.
(Embodiment 2)

FIG. 4 is a diagram for indicating an arrangement of a power converting apparatus according to an embodiment mode 2 of the present invention, and represents an arrangement of 1 phase, namely the U phase among 3 (three) phases. Since arrangements of other phases, i.e., the V phase and the W phase are similar to this U phase, drawings and explanations thereof are omitted. Also, since a 3-phase inverter circuit of the power converting apparatus is similar to the 3-phase inverter circuit 50 shown in FIG. 6 of the above-explained prior art, a drawing and an explanation thereof are omitted.

In FIG. 4, symbols R3, R4, R5 indicate resistors functioning as a second voltage dividing resistor for dividing a power supply potential; reference numeral 10b indicates control means; reference numeral 11b represents a comparator for VP functioning as a first comparator for judging as to whether or not the output potential Vo approximates to the positive polarity voltage; reference numeral 12b indicates a comparator for VN functioning as a second comparator for judging as to whether or not the output potential Vo approximates to the negative polarity voltage; symbol "VPc" indicates an output of the VP comparator 11b; symbol "VNc" denotes an output of the VN comparator 12b; reference numeral 51a shows a self dis-igniting element functioning as a switching semiconductor element for an upper arm; reference numeral 51d indicates a self dis-igniting element functioning as a switching semiconductor element for a lower arm; and reference numeral 61 represents a voltage detecting circuit for detecting the output voltage of the inverter via a voltage dividing resistor, while setting either a potential at a positive polarity of a DC power supply or a potential at a negative polarity of this DC power supply.

The control means 10b judges as to whether or not a failure happens to occur based upon the outputs derived from the VP comparator 11b and the VN comparator 12b, and further outputs of igniting signals for the self dis-igniting element 51a functioning as the switching semiconductor element for the upper arm, and also the self dis-igniting element 51d functioning as the switching semiconductor element for the lower arm.

In such a case that the control means 10b judges that the abnormal operation is present, switching operation of a switching semiconductor element provided opposite to such a switching semiconductor element that the failure happens to occur is interrupted by an interruption circuit (not shown).

In the embodiment mode 1, the reference value used to judge as to whether or not the output potential Vo of the VP comparator 11b approximates to the positive polarity voltage, and the reference value used to judge as to whether or not the output potential Vo of the VN comparator 12b approximates to the negative polarity voltage are externally supplied. In contrast, in this embodiment mode 2, this reference value may be produced by dividing the power supply potential by the voltage dividing resistor.
(Embodiment 3)

Figure 5:
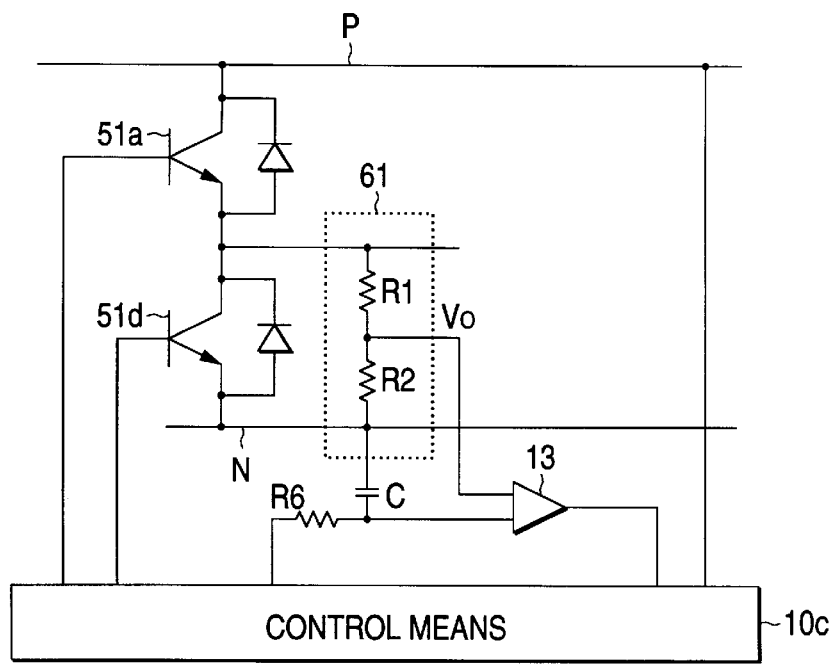
FIG. 5 is a diagram for showing an arrangement of a power converting apparatus according to another embodiment mode of the present invention.

FIG. 5 is a diagram for indicating an arrangement of a power converting apparatus according to an embodiment mode 3 of the present invention, and represents an arrangement of 1 phase, namely the U phase among 3 (three) phases. Since arrangements of other phases, i.e., the V phase and the W phase are similar to this U phase, drawings and explanations thereof are omitted. Also, since a 3-phase inverter circuit of the power converting apparatus is similar to the 3-phase inverter circuit 50 shown in FIG. 6 of the above-explained prior art, a drawing and an explanation thereof are omitted.

In FIG. 5, reference numeral 10c indicates control means; symbol "R6" denotes a resistor; symbol "C" represents a capacitor; and reference number 13 is a comparator functioning as a comparator for judging a positive-polarity-voltage approximate value of an output potential Vo, and a negative-polarity-voltage approximate value of the output potential Vo. Also, reference numerals 51a and 51d show self dis-igniting elements; and reference numeral 61 is a voltage detecting circuit for detecting an output voltage of an inverter via a voltage dividing resistor, while setting as a reference, a potential at a positive polarity of a DC power supply, or a potential at a negative polarity of this DC power supply.

The control means 10c switches a comparison signal for detecting the positive polarity approximate value, and also a comparison signal for detecting the negative polarity approximate value, which are used as the reference values for the judgment by the comparator 13 in response to igniting conditions of the self dis-igniting element 51a functioning as the switching semiconductor element for the upper arm, and of the self dis-igniting element 51d functioning as the switching semiconductor element for the lower arm. Also, the control means 10c judges as to whether or not a failure happens to occur based upon the output derived from the comparator 13, and an output of an igniting signal for the self dis-igniting element 51a functioning as the switching semiconductor element for the upper arm, and further an output of an igniting signal for the self dis-igniting element 51d functioning as the switching semiconductor element for the lower arm.

In such a case that the control means 10c judges that the abnormal operation is present, switching operation of a switching semiconductor element provided opposite to such a switching semiconductor element that the failure happens to occur is interrupted by an interruption circuit (not shown).

In this embodiment mode, with respect to the comparator 13 for judging the positive-polarity-potential approximate value of the output potential Vo, and the negative-polarity-potential approximate value of this output potential Vo, the comparison signal for detecting the positive polarity detecting value and the comparison signal for detecting the negative polarity detecting value, functioning as the reference values of the judgments, are switched in response to the ignition conditions of the self dis-igniting elements.

As previously explained, the above description has been made such that the negative polarity was used as the reference as to the power supply reference. Alternatively, even when the positive polarity is used as the reference, a similar effect may be achieved.

In the above explanation, the control means 10a, 10b, 10c have been employed as the control means exclusively used to judge whether or not the shortcircuits happen to occur. Alternatively, even when this function is introduced to the control apparatus 55 indicated in the prior art power converting apparatus, a similar effect may be achieved.

Since this invention is arranged in the above-described manner, the below-mentioned effects can be achieved.

The power converting apparatus, according to one embodiment of the present invention, is comprised of: the inverter unit arranged by the switching semiconductor element for the upper arm and another switching semiconductor element for the lower arm, and for turning ON/OFF the switching semiconductor elements to thereby convert the DC power inputted from the DC power supply into the AC power; the voltage detecting circuit for detecting the output voltage of the inverter unit via the voltage dividing resistor, while using as the reference the potential at the positive polarity of the DC power supply, or the potential at the negative polarity thereof; the first comparator for judging as to whether or not the detection voltage detected by the voltage detecting circuit is substantially equal to the voltage of the positive polarity; the second comparator for judging as to whether or not the detection voltage detected by the voltage detecting circuit is substantially equal to the voltage of the negative polarity; and the control means for judging as to whether or not the abnormal operation is present based upon the outputs derived from the first comparator and the second comparator, and the output of the igniting signal for ON/OFF-controlling the switching semiconductor elements. As a consequence, the abnormal operations of the switching semiconductor elements employed in the inverter unit, and also of the circuit (not shown) for supplying the igniting signals to the switching semiconductor elements can be detected by using the simple circuit arrangement.

Also, the control means judges as to whether or not the abnormal operation is present based on the output derived from the first comparator and the second comparator, and the outputs of the igniting signals of the switching semiconductor elements for the upper arm and the lower arm, taking account of switching delays when the igniting signals of the switching semiconductor elements for the upper arm and also for the lower arm are switched. Accordingly, the abnormal condition detecting operations for the switching semiconductor elements employed in the inverter unit, and the circuit (not shown) for supplying the igniting signals to the switching semiconductor elements can be more correctly carried out.

Furthermore, the power converting apparatus, according to another embodiment of the present invention, is comprised of: the voltage detecting circuit for detecting the output voltage of the inverter unit via the first voltage dividing resistor, while using as the reference the potential at the positive polarity of the DC power supply, or the potential at the negative polarity thereof; the first comparator for judging as to whether or not the detection voltage detected by the voltage detecting circuit is substantially equal to the voltage of the positive polarity; the second comparator for judging as to whether or not the detection voltage detected by the voltage detecting circuit is substantially equal to the voltage of the negative polarity; and the control means for judging as to whether or not the abnormal operation is present based upon the outputs derived from the first comparator and the second comparator, and the output of the igniting signal for ON/OFF-controlling the switching semiconductor elements, whereby: the voltage for constituting judgment references of the first comparator and the second comparator is produced by dividing the power supply potential by the second voltage dividing resistor. As a result, the adverse influences caused by the variations in the power supply voltage can be eliminated with respect to the comparison signals of the comparators for judging the positive-polarity approximate value of the output potential and the negative-polarity approximate value thereof. The abnormal condition detecting operations for the switching semiconductor elements employed in the inverter unit, and the circuit (not shown) for supplying the igniting signals to the switching semiconductor elements can be more correctly carried out.

In addition, the power converting apparatus, according to another embodiment of the present invention, is comprised of: the voltage detecting circuit for detecting the output voltage of the inverter unit via the voltage dividing resistor, while using as the reference the potential at the positive polarity of the DC power supply, or the potential at the negative polarity thereof; the comparator for judging as to whether or not the detection voltage detected by the voltage detecting circuit is substantially equal to the voltage of the positive polarity, or the voltage of the negative polarity; and the control means for switching the comparator signal used to detect the voltage nearly equal to the positive electrode and the comparator signal used to detect the voltage nearly equal to the negative electrode as the reference value judged by this comparator in response to the igniting conditions of the switching semiconductor elements for the upper arm and the lower arm for constituting the inverter unit, and for judging as to whether or not the abnormal operation is present based upon the output derived from the comparator and also outputs of igniting signals of the upper arm and also of the lower arm. As a consequence, the detecting circuit can be made simple, and furthermore, in the case that the abnormal conditions happen to occur in the switching semiconductor elements of the inverter unit, and the circuit (not shown) for outputting the igniting signals to the switching semiconductor elements, the arm under abnormal condition can be specified.

Also, since the power converting apparatus is further comprised of: the interrupting circuit for interrupting the switching operation of the switching semiconductor element positioned opposite to such the switching semiconductor element that the abnormal operation happens to occur when the judgment is made that the abnormal operation is judged, the secondary damage can be prevented.

What is claimed is:

1. A power converting apparatus comprising:

an inverter unit including a switching semiconductor element for an upper arm and another switching semiconductor element for a lower arm, and for turning ON and turning OFF the switching semiconductor elements to thereby convert DC power, inputted from a DC power supply, into AC power;

a voltage detecting circuit for detecting an output voltage of the inverter unit via a voltage dividing resistor, while using as a reference a potential at a positive polarity of the DC power supply, or a potential at a negative polarity thereof;

a first comparator for judging as to whether the detection voltage detected by a voltage detecting circuit is substantially equal to a voltage of the positive polarity;

a second comparator for judging as to whether the detection voltage detected by the voltage detecting circuit is substantially equal to a voltage of the negative polarity; and control means for judging as to whether an abnormal operation is present based upon outputs derived from the first comparator and the second comparator, and an output of the igniting signal for turning ON and turning OFF of said switching semiconductor elements.

2. A power converting apparatus as claimed in claim 1 wherein: said control means judges as to whether or not the abnormal operation is present based on the output derived from said first comparator and said second comparator, and the outputs of the igniting signals of said switching semiconductor elements for said upper arm and said lower arm, taking account of switching delays when the igniting signals of the switching semiconductor elements for the upper arm and also for the lower arm are switched.

3. A power converting apparatus comprising:

an inverter unit including a switching semiconductor element for an upper arm and another switching semiconductor element for a lower arm, and for turning ON and turning OFF the switching semiconductor elements to thereby convert DC power, inputted from a DC power supply, into AC power;

a voltage detecting circuit for detecting an output voltage of the inverter unit via a first voltage dividing resistor, while using as a reference a potential at a positive polarity of the DC power supply, or a potential at a negative polarity thereof;

a first comparator for judging as to whether the detection voltage detected by a voltage detecting circuit is substantially equal to a voltage of the positive polarity;

a second comparator for judging as to whether the detection voltage detected by the voltage detecting circuit is substantially equal to a voltage of the negative polarity; and control means for judging as to whether an abnormal operation is present based upon outputs derived from the first comparator and the second comparator, and an output of the igniting signal for turning ON and turning OFF of said switching semiconductor elements;

wherein a voltage used as judgment references of the first comparator and the second comparator is produced by dividing the power supply potential by a second voltage dividing resistor.

4. A power converting apparatus comprising:

an inverter unit including a switching semiconductor element for an upper arm and another switching semiconductor element for a lower arm, and for turning ON and turning OFF the switching semiconductor elements to thereby convert DC power, inputted from a DC power supply, into AC power;

a voltage detecting circuit for detecting an output voltage of the inverter unit via a voltage dividing resistor, while using as a reference a potential at a positive polarity of the DC power supply, or a potential at a negative polarity thereof;

a comparator for judging as to whether the detection voltage detected by a voltage detecting circuit is substantially equal to a voltage of the positive polarity or a voltage of the negative polarity;

control means for choosing a comparator signal used to detect the voltage nearly equal to the positive electrode or a comparator signal used to detect the voltage nearly equal to the negative electrode as a reference value used by said comparator in response to igniting conditions of the switching semiconductor elements for the upper lower arms, and for judging whether an abnormal operation is present based upon an output derived from said comparator and also outputs of igniting signals of said upper and lower arms.

5. A power converting apparatus as claimed in claim 1 further comprising an control apparatus which interrupts the switching operation of one of said switching semiconductor elements positioned opposite to the other of said switching semiconductor elements for which said output of said control means indicates said abnormal operation.

6. A power converting apparatus as claimed in claim 3 further comprising an control apparatus which interrupts the switching operation of one of said switching semiconductor elements positioned opposite to the other of said switching semiconductor elements for which said output of said control means indicates said abnormal operation.

7. A power converting apparatus as claimed in claim 4 further comprising an control apparatus which interrupts the switching operation of one of said switching semiconductor elements positioned opposite to the other of said switching semiconductor elements for which said output of said control means indicates said abnormal operation.

* * * * *